US006956980B2

(12) United States Patent
Nagata et al.

(10) Patent No.: US 6,956,980 B2
(45) Date of Patent: Oct. 18, 2005

(54) OPTICAL WAVEGUIDE TYPE OPTICAL MODULATOR AND PRODUCTION METHOD THEREFOR

(75) Inventors: Hirotoshi Nagata, Funabashi (JP); Yasuyuki Miyama, Funabashi (JP); Futoshi Yamamoto, Funabashi (JP); Takashi Shinriki, Funabashi (JP); Ryo Shimizu, Funabashi (JP)

(73) Assignee: Sumitomo Osaka Cement Co., Ltd., (JP)

( * ) Notice: Subject to any disclaimer, the term of this patent is extended or adjusted under 35 U.S.C. 154(b) by 251 days.

(21) Appl. No.: 10/380,585

(22) PCT Filed: Sep. 18, 2001

(86) PCT No.: PCT/JP01/08094

§ 371 (c)(1),
(2), (4) Date: Mar. 13, 2003

(87) PCT Pub. No.: WO02/23261

PCT Pub. Date: Mar. 21, 2002

(65) Prior Publication Data

US 2004/0033001 A1  Feb. 19, 2004

(30) Foreign Application Priority Data

Sep. 18, 2000 (JP) .............................. 2000282624

(51) Int. Cl.[7] .............................. G02F 1/35; G02B 6/12
(52) U.S. Cl. ...................... 385/2; 385/3; 385/8; 385/14
(58) Field of Search ............................ 385/2–3, 8, 14; 359/245

(56) References Cited

U.S. PATENT DOCUMENTS 5,526,448 A  6/1996 Nagata et al. .................. 385/1
5,748,358 A * 5/1998 Sugamata et al. .......... 359/245
5,949,944 A  9/1999 Minford et al. ............. 385/131
6,282,356 B1  8/2001 Johnston, Jr. et al. ...... 385/129

FOREIGN PATENT DOCUMENTS

CA         2133300          5/1995

(Continued)

OTHER PUBLICATIONS

S.K. Ghosh, et al., "Preparation and Characterization of Reactively Sputtered Silicon Nitride Thin Films", *Thin Solid Films*, vol. 166, Dec. 1, 1988, pp. 359-366.

(Continued)

*Primary Examiner*—Frank G. Font
*Assistant Examiner*—Michael P. Mooney
(74) *Attorney, Agent, or Firm*—Ostrolenk, Faber, Gerb & Soffen, LLP

(57) ABSTRACT

There is provided a high performance optical waveguide type optical modulator with excellent long term reliability, in which contamination of the buffer layer in a forming process of a signal field adjustment region on the buffer layer by a lift-off method or an etching method, is prevented and DC drift thus suppressed. The optical waveguide type optical modulator 10 comprises a substrate 11 having an electro-optic effect, optical waveguides 12 formed on the surface of this substrate 11, a traveling-wave type signal electrode 13a and ground electrodes 13b which are provided on the substrate 11 and control a lightwave, and a buffer layer 14 provided between the electrodes 13 and the optical waveguides 12, and furthermore, a dielectric layer 15 is provided on the entire surface of the buffer layer 14 on the side of the electrodes 13, and a signal field adjustment region 16 which has a wider width than that of the traveling-wave type signal electrode 13a and is made of a material with a higher refractive index than that of the dielectric layer 15 is formed between the dielectric layer 15 and the traveling-wave type signal electrode 13a.

8 Claims, 7 Drawing Sheets

FOREIGN PATENT DOCUMENTS

| | | |
|---|---|---|
| CA | 2207715 | 12/1997 |
| CA | 2303674 | 10/2000 |
| EP | 0652457 | 5/1995 |
| EP | 0813092 | 12/1997 |
| EP | 1043617 | 11/2000 |
| JP | 61-47929 | 3/1986 |
| JP | 2-196213 | 8/1990 |
| JP | 3-249626 | 11/1991 |
| JP | 6-274954 | 9/1994 |
| JP | 7-128624 | 5/1995 |
| JP | 7-168042 | 7/1995 |
| JP | 7-92337 | 3/1996 |
| JP | 9-236731 | 9/1997 |
| JP | 9-281454 | 10/1997 |
| JP | 10-3065 | 1/1998 |
| JP | 10-48583 | 2/1998 |
| JP | 10-133158 | 5/1998 |
| JP | 10-288717 | 10/1998 |
| JP | 2000-122016 | 4/2000 |
| JP | 2000-162455 | 6/2000 |
| JP | 2000-214345 | 8/2000 |
| JP | 2000-352700 | 12/2000 |
| JP | 2001-133743 | 5/2001 |

OTHER PUBLICATIONS

Office Action issued by Japanese Patent Office against counterpart Japanese patent application No. 2000-195234 dated Aug. 24, 2004 and English translation thereof.

Office Action issued by Japanese Patent office against counterpart Japanese patent application No. 2000-282624, dated Jan. 25, 2005 and English Translation thereof.

English translation of Abstract for Japanese patent application No. 10-288717.

English translation of Abstract for Japanese patent application No. 7-92337.

English translation of Abstract for Japanese patent application No. 9-236731.

English translation of Abstract for Japanese patent application No. 2000-162455.

English translation of Abstract for Japanese patent application No. 2000-214345.

* cited by examiner

OPTICAL WAVEGUIDE TYPE OPTICAL MODULATOR AND PRODUCTION METHOD THEREFOR

TECHNICAL FIELD

The present invention relates to an optical waveguide type optical modulator suited to use in optical fiber communication systems and the like, and a manufacturing method thereof.

BACKGROUND ART

Recently, optical waveguide type optical modulators 140 as shown in FIG. 9 have become very common in optical fiber communication systems. In this optical waveguide type optical modulator 140, optical waveguides 142 are formed on a substrate 141 which has an electro-optic effect, and a guided lightwave which travels in he optical waveguides 142 is controlled by a traveling-wave type signal electrode 143a and grounded electrodes 143b. In the optical waveguide type optical modulator 140 of this example, normally, a buffer layer 144 made of an insulating material such as silicon oxide is formed on the substrate 141 to prevent absorption of the guided lightwave which travels in the optical waveguide 142 by the electrodes 143. Furthermore, a signal field adjustment region 145, which has wider width than that of the traveling-wave type signal electrode 143a, is formed between the traveling-wave type signal electrode 143a and the buffer layer 144, allowing the effective refractive index of the microwaves which propagate the electrodes 143 to be adjusted.

Such an optical waveguide type optical modulator 140 can be manufactured using the following method.

At first, after the optical waveguides 142 are formed by thermal diffusion on the surface of the substrate 141 which is made of a ferroelectric substance, the buffer layer 144 is formed on the substrate 141 using methods such as vacuum deposition or sputtering. Subsequently, the signal field adjustment region 145 is formed at a predetermined position on this buffer layer 144. Then, the traveling-wave type signal electrode 143a is formed at a predetermined position on the signal field adjustment region 145, and the ground electrodes 143b are formed at predetermined positions on the buffer layer 144, at different positions from the signal field adjustment region 145.

In such a manufacturing process, the signal field adjustment region 145 is normally formed using a lift-off method or an etching method.

In a lift-off method, at first, a photoresist is applied to the buffer layer 144. Then after exposing a desired pattern onto the photoresist using a photomask, this resist pattern is developed to make the masked portions, excluding the predetermined position where the signal field adjustment region 145 is to be formed. Subsequently, a film of the metal or semiconductor or the like which forms the signal field adjustment region 145 is deposited thereon, and by removing the resist using a resist removal agent, the film on the resist is removed at the same time, thereby forming the signal field adjustment region 145 at a predetermined position on the buffer layer 144.

An example of an etching method is a wet etching method employing a liquid etchant. In order to form the signal field adjustment region 145 using a wet etching method, firstly, a film of the metal or semiconductor or the like which forms the signal field adjustment region 145 is deposited on the buffer layer 144, and a photoresist is applied thereon. After exposing a desired pattern onto the photoresist using a photomask, this resist pattern is developed, masking the predetermined position where the signal field adjustment region 145 is to be formed. Then, the exposed portions of the film are removed using an etchant of mixed acid or the like. The remaining photoresist is then removed using a resist removal agent, thereby forming the signal field adjustment region 145 at a predetermined position on the buffer layer 144.

However, when the signal field adjustment region is formed on the buffer layer using a lift-off method, because the photoresist is applied directly to the buffer layer and hardened, the principal components and the diluent which constitute the photoresist may penetrate the buffer layer, causing contamination of the buffer layer. In particular, if the buffer layer is silicon oxide, the surface of the buffer layer is sometimes treated with vapor of an amine-based compound in order to improve the adhesive strength of the photoresist to the silicon oxide, and in such a case, the buffer layer can also be contaminated by the amine-based compound.

Furthermore, when the resist pattern is developed, or when a metal or semiconductor is deposited to form the signal field adjustment region, solutions such as resist developer or special chemical agents are used in these processes. Consequently, there is a danger that the penetration of the resist components into the buffer layer may be accelerated because components from the resist can dissolve in these solutions. Moreover, these solutions may also be a source of contamination themselves.

Furthermore, when the signal field adjustment region is formed using a wet etching method, there is a danger that the buffer layer is contaminated by contacting the etchant or the resist removal agent.

If the buffer layer is contaminated, DC drift in the optical waveguide type optical modulator is promoted by the presence of ions derived from the contaminants, thereby reducing the long-term reliability of the optical waveguide type optical modulator. Moreover, in the case that degree of contamination being high, the insulating properties of the buffer layer deteriorate greatly, allowing a portion of, or most of the electric field applied from the electrodes to be leaked through the buffer layer, which means that an electric field cannot be efficiently generated in the optical waveguide, and even though a signal field adjustment region is provided, the effect of the region may be inadequate.

Such contamination of the buffer layer has a great influence on the performance of the optical waveguide type optical modulator. In order to suppress this contamination, it is necessary to control the density and the microstructure or the like of the buffer layer itself, and also precisely control the conditions for the lift-off process and the etching process, but it is extremely difficult to control these conditions.

On the other hand, FIG. 10 shows a cross-sectional view of another example of a conventional optical waveguide type optical modulator. This example is similar to that shown in FIG. 9, but differs in terms of structure.

This optical waveguide type optical modulator uses a ferroelectric substrate made of lithium niobate ($LiNbO_3$), which is the most common and practical material for optical waveguide type optical modulators using ferroelectric substrates.

In FIG. 10, reference numeral 210 indicates a Z-cut ferroelectric substrate made of lithium niobate. The axis inducing the electro-optic effect of this ferroelectric substrate 210 is in the direction of the Z axis, which is the main optical axis (the crystallographic c axis), and as shown in FIG. 10, is aligned with a direction orthogonal to the surface where the optical waveguides 202 are formed (termed as the "main surface" in this specification) in the ferroelectric substrate 210.

The optical waveguides 202, fabricated by thermal diffusion of Ti, are formed near the main surface of the ferroelectric substrate 210, and a buffer layer 203 made of $SiO_2$ is formed thereon. In addition, electrodes 204 made of Au are formed on the buffer layer 203 so as to be parallel to the optical waveguides 202. A transition metal layer 205 consisting of a transition metal such as Ti, Cr, Ni or the like is provided between the electrode 204 and the buffer layer 203.

Such an optical waveguide type optical modulator can be manufactured using a method in which, firstly, the optical waveguides 202 are formed on the main surface of the ferroelectric substrate 210 by means of thermal diffusion, and then the buffer layer 203 is formed on the side of the ferroelectric substrate 210 on which the optical waveguides 202 are formed, using a method such as vacuum deposition or sputtering. Then, a transition metal film and an Au film are formed sequentially on the entire upper surface of the buffer layer 203 by vacuum deposition. A thick Au layer accumulated on this Au film by an electroplating process, only within an electrode forming region, where the electrodes 204 are to be formed, thereby forming the electrodes 204. Subsequently, the Au film and the transition metal film remaining between the electrodes 204 is removed by chemical etching, to obtain a transition metal layer 205.

However, because the buffer layer 203 of such an optical waveguide type optical modulator is exposed between the electrodes 204, the modulator has a disadvantage that an exposed surface 203a of the buffer layer 203 and the inside of the buffer layer 203 are easily contaminated by contaminants such as K, Ti and Cr.

In particular, when vacuum deposition method is used to form the buffer layer 203 with a low density so as to control the characteristics of the optical waveguide type optical modulator, a problem that contaminants can easily penetrate the buffer layer 203 via the exposed portions may be occurred.

If the surface 203a of the buffer layer 203 of the optical waveguide type optical modulator and the inside of the buffer layer 203 are contaminated, DC drift may occur. DC drift refers to a phenomenon that the presence of alkali ions such as K or Na and mobile ions like proton causes the electric current leakage applied to the electrode 204 through the buffer layer 203, causing that the desired voltage (bias) cannot be applied, which has a negative effect on the characteristics of the optical waveguide type optical modulator.

In addition, if the contaminants in the buffer layer 203 reach to the interface between the ferroelectric substrate 210 and the buffer layer 203 as a result of thermal treatment performed during the mounting process of modulator chip or the like, the chemical bonds of the $SiO_2$ buffer layer 203 can be broken by the contaminants, reducing the bonds binding the ferroelectric substrate 210 comprising lithium niobate and the buffer layer 203. As a result, it is expected that the bonding strength between the ferroelectric substrate 210 and the buffer layer 203 is weakened remarkably.

DISCLOSURE OF THE INVENTION

An optical waveguide type optical modulator according to a first embodiment of the present invention comprises a substrate having an electro-optic effect, optical waveguides formed on the surface of this substrate, a traveling-wave type signal electrode and ground electrodes which are provided on the substrate and control a guided lightwave, and a buffer layer provided between the electrodes and the optical waveguides, and furthermore, a dielectric layer is provided on the entire surface of the buffer layer on the side of the electrodes, and a signal field adjustment region which has wider width than that of the traveling-wave type signal type electrode and is made of a material with a higher refractive index than that of the dielectric layer is formed between the dielectric layer and the traveling-wave type signal electrode. In the optical waveguide type optical modulator described above, the signal field adjustment region may be made of silicon, and the substrate may be made of lithium niobate, the buffer layer may be made of silicon oxide, and the dielectric layer may be made of silicon nitride or silicon oxynitride. Furthermore, the thickness of the dielectric layer may be less than that of the thickness of the signal field adjustment region.

A method of manufacturing this type of optical waveguide type optical modulator comprises a process (1) in which the dielectric layer is formed on the entire surface of the buffer layer, and a process (2) in which the signal field adjustment region is formed at a predetermined position on the dielectric layer. Furthermore, in this manufacturing method, the process (2) may be a process wherein the signal field adjustment region is formed at a predetermined position on the dielectric layer by applying a mask to those portions on the dielectric layer excluding the predetermined position where the signal field adjustment region is to be formed, depositing a film of the material which forms the signal field adjustment region, and then removing the mask. In this case, the mask is a photoresist, and the removal of the mask may be performed using a resist removal agent. Furthermore, the process (1) for forming the dielectric layer in this manufacturing method may be performed by a sputtering method.

As shown above, in the present invention, because the dielectric layer is formed on the entire surface of the buffer layer, when the signal field adjustment region is formed by a lift-off method or an etching method, resist components, the resist removal agent, and chemical etchant or the like do not directly contact the buffer layer. Accordingly, an optical waveguide type optical modulator with excellent long-term reliability can be provided in which contamination of the buffer layer can be prevented, and DC drift caused by such contamination can be suppressed.

Furthermore, if the buffer layer is made of silicon oxide, the dielectric layer is made of silicon nitride or silicon oxynitride, and the signal field adjustment region is made of silicon, then the optical waveguide type optical modulator has superior high frequency properties. And because the refractive index of the dielectric layer can be defined arbitrarily by varying the ratio of oxygen to nitrogen in the dielectric layer, the high frequency properties are more widely adjustable. In addition, because the interfaces between these layers are strongly joined by covalent bonding via silicon (Si), an optical waveguide type optical modulator in which the films have excellent bonding strength can be obtained.

An optical waveguide type optical modulator according to a second embodiment of the present invention comprises a ferroelectric substrate made of a single crystal having an electro-optical effect and with optical waveguides formed on a main surface thereof, and a buffer layer and electrodes provided on the main surface side of the ferroelectric substrate, wherein the axis of the ferroelectric substrate inducing an electro-optical effect is orthogonal to the main surface of the ferroelectric substrate, and an electrically insulating protective film with a thickness of 50 to 200 nm is provided on the upper surface of the buffer layer at least in those regions where the electrodes are not formed, and on the side surfaces of the buffer layer parallel to the lightwave guiding direction. Here, in the optical waveguide type optical modulator of this embodiment, it is preferable that this protective film is provided on the whole area of the upper surface of the buffer layer including the regions where the electrodes are formed, or that the protective film provided on the upper surface of the buffer layer and the protective film provided on the side surfaces of the buffer layer parallel to lightwave-guiding direction are made of the same materials. Furthermore, this protective film is preferably an amorphous film.

A method of manufacturing such an optical waveguide type optical modulator comprises a process for forming optical waveguides on the surface of a ferroelectric substrate, which is made of a single crystal having an electro-optic effect, and the axis inducing an electro-optical effect is orthogonal to the main surface; a process for forming a buffer layer on the side of the ferroelectric substrate on which the optical waveguides are formed; a process for forming an electrically insulating protective film with a thickness of 50 to 200 nm on the buffer layer, at least in those regions excluding an electrode forming region; and a process for forming electrodes in the electrode forming region.

Furthermore, in the method of manufacturing the optical waveguide type optical modulator described above, the protective film is preferably formed after performing heat treatment, which the ferroelectric substrate having the buffer layer is heated in a film deposition apparatus. The buffer layer in this optical waveguide type optical modulator sometimes adsorb moisture during the interval between the buffer layer formation and the protective film formation, which has a negative effect on the stability of the operation of the optical waveguide type optical modulator. In particular, if the density of the buffer layer is low, then the buffer layer adsorbs moisture from the atmosphere quite easily.

According to the method of manufacturing an optical waveguide type optical modulator described above, because the ferroelectric substrate having the buffer layer undergoes heat treatment in the film deposition apparatus preceding the formation of the protective film even if the buffer layer adsorbs moisture during the interval between the buffer layer formation and the protective film formation, this moisture can be removed by the heat treatment. Accordingly, an optical waveguide type optical modulator with excellent stability of operation can be obtained.

In this manner, in the optical waveguide type optical modulator of the present invention, because the protective film is provided on the buffer layer, at least in the regions where the electrodes are not formed, and on the side surfaces of the buffer layer parallel to the lightwave-guiding direction, the surface or the buffer layer and the side surface of the buffer layer in the optical waveguide direction are not exposed. Consequently, an optical waveguide type optical modulator is obtained in which the surface of the buffer layer and the inside of the buffer layer are not easily contaminated.

Accordingly, leakage of the electric current applied to the electrodes caused by contaminants on the surface or inside of the buffer layer can be prevented, and stability in the operation of the optical waveguide type optical modulator can be ensured. Furthermore, even if a DC bias superposing on high frequency voltage is applied to the electrodes, good stability can still be achieved in this state. In other words, the occurrence of DC drift can be prevented. In addition, because the buffer layer is not easily contaminated, a reduction in the bonding strength between the ferroelectric substrate and the buffer layer caused by contamination of the buffer layer is hard to occur.

Furthermore, because the protective film is electrically insulating, leakage of the electric current applied to the electrodes can be more reliably prevented, and the operational stability of the optical waveguide type optical modulator can be ensured. Accordingly, the effects achieved by preventing the occurrence of DC drift can be further enhanced. In addition, because the thickness of the protective layer is between 50 and 200 nm, the occurrence of DC drift can be effectively prevented.

BEST MODE FOR CARRYING OUT THE INVENTION

As follows is a description of preferred embodiments of an optical waveguide type optical modulator according to the present invention, with reference to the drawings. However, the present invention is not limited to the following embodiments, and any kind of variation or modification such as combinations of structural elements of different embodiments may be made.

Figure 1:
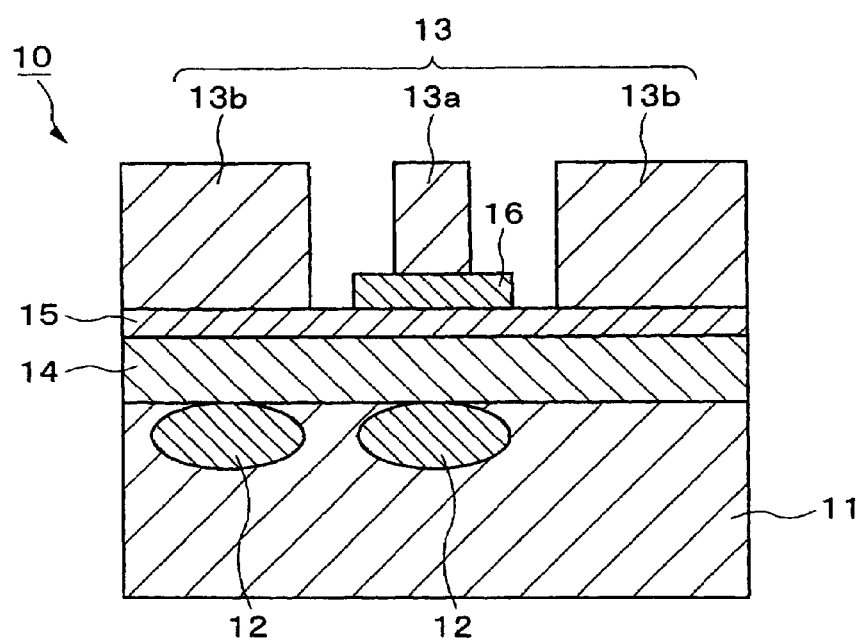
FIG. 1 is a cross-sectional view showing an optical waveguide type optical modulator of a first embodiment.

FIG. 1 is a cross-sectional view showing the structure of an optical waveguide type optical modulator 10 according to a first embodiment of the present invention, and the reference numeral 11 indicates a substrate made of a ferroelectric substance such as lithium niobate.

Because it is relatively easy to grow the large crystals of lithium niobate which are used as the single crystal substrates in the optical waveguide type optical modulators in the present application, integrated devices having a large scale can be realized by using a ferroelectric substrate made of lithium niobate.

Furthermore, since single crystal of lithium niobate has high Curie temperature approximately up to 1000° C., there is a high degree of freedom with regard to temperature in the manufacturing process of the optical waveguide type optical modulator.

Optical waveguides 12 fabricated by thermal diffusion of titanium are formed on the surface of this substrate 11, so that the lightwave is guided in the lengthwise direction of the optical waveguides 12. Electrodes 13 which control the guided lightwave are formed on the substrate 11 on which the optical waveguides 12 are formed, and in this example, a traveling-wave type signal electrode 13a is provided in the center of the substrate 11, and ground electrodes 13b are provided on both sides thereof. Furthermore, a buffer layer 14 with a thickness of 200 to 2000 nm is provided between the electrodes 13 and the optical waveguides 12 on the entire surface of the substrate 11, so that the guided lightwave which travels the optical waveguides 12 is not absorbed by the electrodes 13.

Furthermore, a dielectric layer 15 with a thickness of 10 to 200 nm which prevents contamination of the buffer layer 14 during the manufacturing process of the optical waveguide type optical modulator 10 is provided on the entire surface of the buffer layer 14.

In addition, a signal field adjustment region 16 with a thickness of 10 to 200 nm, which has wider width than that of the traveling-wave type signal electrode 13a and is made of a material with a higher refractive index than that of the dielectric layer 15, is provided between the dielectric layer 15 and the traveling-wave type signal electrode 13a, allowing the effective refractive index of the microwaves which propagate the electrodes 13 to be adjusted.

The buffer layer 14 is usually formed from a substance with a small dielectric constant, that is, a small refractive index. Forming the buffer layer 14 from such a substance is desirable because the high frequency properties (bandwidth) of the modulator can be extended. An example of a suitable material is silicon oxide, which is also chemically stable.

For the same reasons as for the buffer layer 14, the dielectric layer 15 is also preferably formed from a substance with a small refractive index, and examples of suitable materials include silicon nitride and silicon oxynitride. Furthermore, the refractive index of the silicon oxynitride can be controlled arbitrary by adjusting the ratio of nitrogen and oxygen from a value similar to that of silicon, through to a value similar to that of silicon oxide.

Furthermore, the signal field adjustment region 16 is formed from a typical metal or a semiconductor, as disclosed in Japanese Unexamined Patent Application, First Publication No. Hei. 10-3065. Accordingly, the refractive index of the signal field adjustment region 16 is inevitably higher than that of the buffer layer 14 and the dielectric layer 15.

In this manner, a material with a low refractive index is selected to form the buffer layer 14 and dielectric layer 15, so as to suppress degradation in the high frequency properties of the optical waveguide type optical modulator 10. In addition, in order to get further extension of the high frequency properties, it is preferable that the dielectric layer 15 is made of a material with a lower refractive index than that of the buffer layer 14. If the dielectric layer 15 is made of a material with a higher refractive index than that of the buffer layer 14, then the thickness of the dielectric layer is preferably as thin as possible, and preferably having the same or less than 100 nm. Furthermore, if the thickness of the dielectric layer 15 is the same or less than that of the signal field adjustment region 16, then the high frequency properties of the optical waveguide type optical modulator 10 are further improved.

If silicon oxide is used as the buffer layer 14, silicon nitride or silicon oxynitride is used as the dielectric layer 15, and silicon is used as the signal field adjustment region 16, then the optical waveguide type optical modulator 10 has excellent high frequency properties, and since the refractive index of the dielectric layer 15 can be defined arbitrarily, the degree of design freedom of the high frequency properties is expanded. In addition, since the interfaces between these layers are strongly joined by covalent bonding via silicon (Si), the bonding strength between the films is favorably improved.

Silicon oxide (Si—O), which has a low refractive index, is suitable for use as the buffer layer which directly contacts the optical waveguides. If the buffer layer is made of silicon oxide, the protective film can be made of silicon (Si), silicon nitride (Si—N), silicon oxynitride (Si—O—N) or silicon oxide (Si—O) or the like, with favorable results.

If the dielectric layer 15 is provided on the entire surface of the buffer layer 14 in this manner, then a high performance optical waveguide type optical modulator 10 in which contamination during manufacturing process of the buffer layer 14 is suppressed, resulting in having a suppressed DC drift property can be manufactured in the manner described below.

Figure 2A:
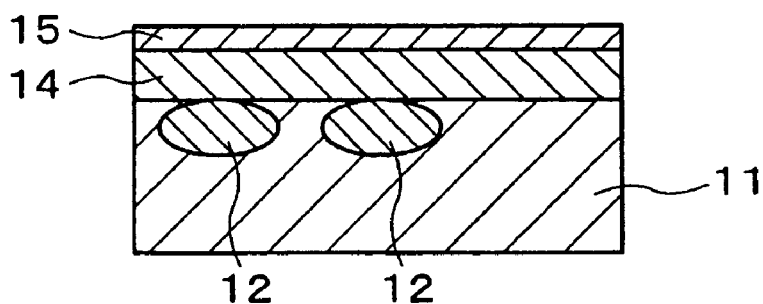
FIG. 2 is a process diagram showing an example of a method of forming a signal field adjustment region in the optical waveguide type optical modulator shown in FIG. 1.

A method of manufacturing the optical waveguide type optical modulator 10 according to the first embodiment shown in FIG. 1 is described below with reference to FIG. 2A through FIG. 2D. At first, the optical waveguides 12 fabricated by thermal diffusion of titanium are formed on the surface of the substrate 11 which has an electro-optic effect. The buffer layer 14 is formed by a vacuum deposition method or the like on the substrate 11 on which the optical waveguides 12 are formed. At this time, in order to adequately oxidize the buffer layer 14, heat treatment is performed under an oxidizing atmosphere at 500 to 700° C. for approximately 5 to 10 hours. Then, by using a process (1), the dielectric layer 15 is formed on the entire surface of the buffer layer 14, as shown in FIG. 2A. Because the dielectric layer 15 is provided in order to prevent contamination of the buffer layer 14, it is preferably as dense as possible, and is usually formed by a normal sputtering method.

Then by using a process (2), the signal field adjustment region 16, made of a material with a higher refractive index than that of the dielectric layer 15, is formed at a predetermined position on the dielectric layer 15.

The formation of the signal field adjustment region 16 in the process (2) is performed using a lift-off method or an etching method or the like, although a lift-off method is preferred because the process is simple, and the process conditions are easier to set compared with an etching method.

In the case of forming the signal field adjustment region 16 using a lift-off method, at first, a photoresist 18 is spin coated on the entire surface of the dielectric layer 15 and subsequently hardened, and the section where the signal field adjustment region 16 is to be formed is then exposed using a photomask.

Figure 2B:
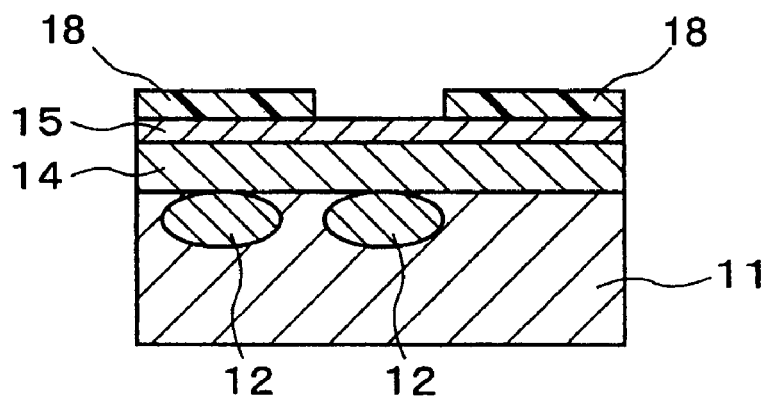

By developing exposed photoresist, the photoresist within the sections where the signal field adjustment region 16 is to be formed is removed, and the sections excluding the predetermined section where the signal field adjustment region 16 to be formed are being masked state by the photoresist 18 as shown in FIG. 2B.

Figure 2C:
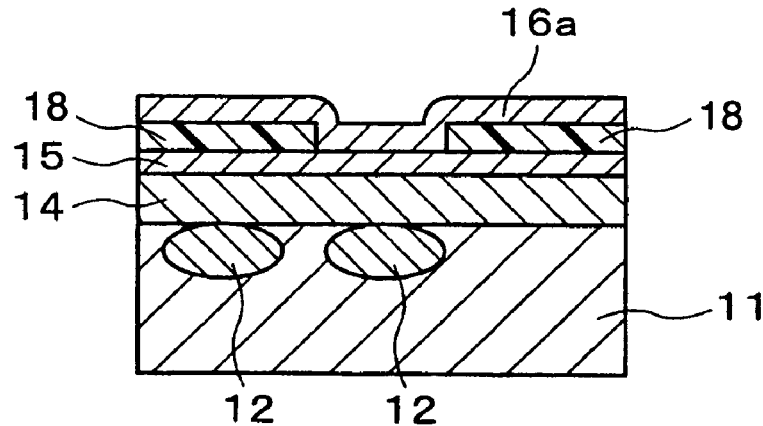

Then, as shown in FIG. 2C, a film 16a made of a material such as silicon, which forms the signal field adjustment region 16, is deposited on the entire surface of the dielectric layer 15 which is masked by the photoresist 18, using a sputtering method or a vacuum deposition method.

Figure 2D:
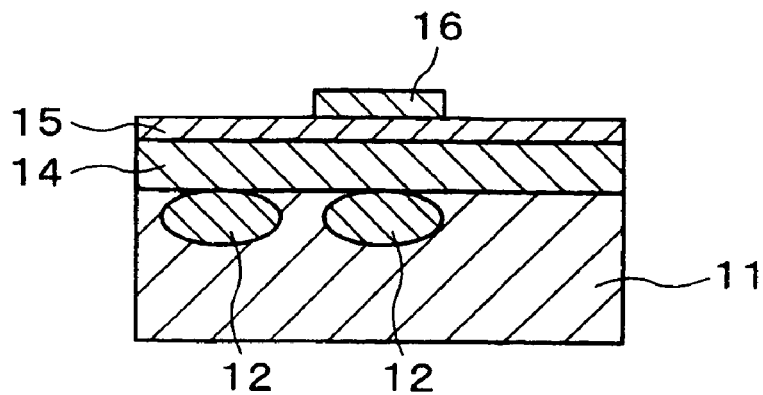

Then by removing the mask using a resist removal agent, the film can be removed along with the mask except at the predetermined position where the signal field adjustment region 16 is formed, resulting in the signal field adjustment region 16 being formed only within this predetermined position, as shown in FIG. 2D.

A method of forming the signal field adjustment region 16 using a wet etching method is shown in FIG. 3A through FIG. 3D.

Figure 3A:
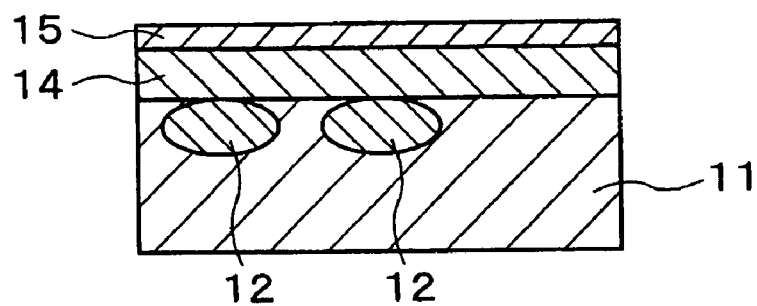
FIG. 3 is a process diagram showing another example of a method of forming a signal field adjustment region in the optical waveguide type optical modulator shown in FIG. 1.
Figure 3B:
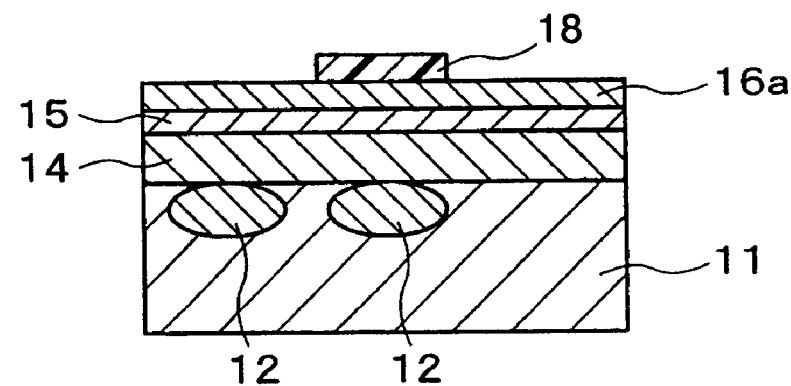
Figure 3C:
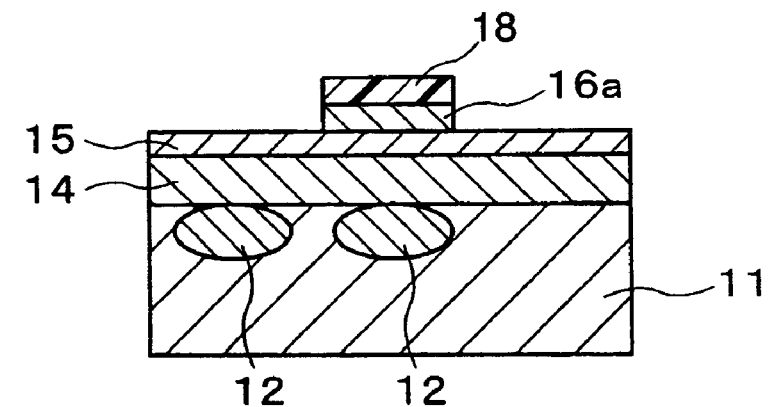
Figure 3D:
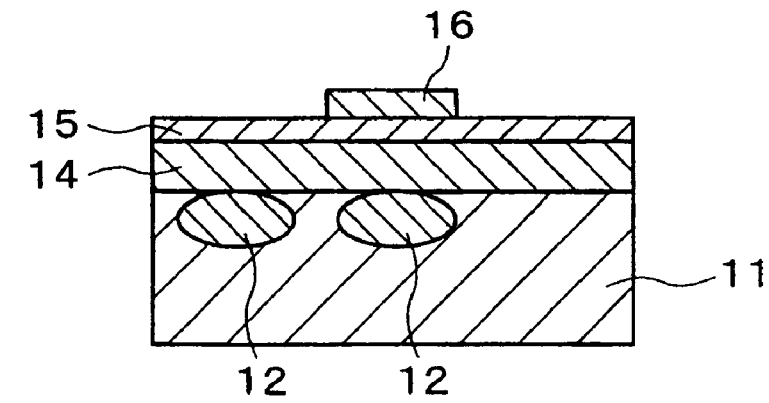

After forming the dielectric layer 15 on the buffer layer 14 as shown in FIG. 3A, a film 16a of the metal or semiconductor which forms the signal field adjustment region 16 is deposited on the dielectric layer 15, and a photoresist 18 is spin-coated thereon. After exposure of the pattern for the signal field adjustment region 16 onto this photoresist 18 using a photomask, the resist pattern is developed and the predetermined position where the signal field adjustment region 16 is to be formed is being a masked state by the photoresist 18, as shown in FIG. 3B. Then, only the exposed portions of the film 16a are removed using an chemical etchant such as a mixed acid or the like (FIG. 3C). Finally, by removing the remaining photoresist 18 using a resist removal agent, the signal field adjustment region 16 is formed only at the predetermined position on the dielectric layer 15 as shown in FIG. 3D.

If the signal field adjustment region 16 is formed using a lift-off method in the manner described above, because the dielectric layer 15 is provided on the buffer layer 14, the photoresist 18 is spin-coated and hardened on the dielectric layer 15, not on the buffer layer 14. Consequently, the principal resist components and the diluent which constitute the photoresist 18 do not penetrate the buffer layer 14, and contamination of the buffer layer 14 can be prevented. Furthermore, in the case that surface treatment using the vapor of an amine-based compound or the like is required so as to improve the adhesion of the photoresist 18, provided the buffer layer 14 do not expose the surface treatment agent because the dielectric layer 15 is provided on the buffer layer 14, and consequently contamination caused by this surface treatment can be suppressed.

In addition to suppressing the contamination caused by the photoresist 18, contamination of the buffer layer 14 caused by solutions such as resist developer and resist removal agent can be suppressed when these solutions are employed for developing or removing the resist pattern or depositing the metal or semiconductor which forms the signal field adjustment region 16. Furthermore, the penetration into the buffer layer 14 of resist components which have dissolved in these solutions, can also be suppressed.

And in the case that the signal field adjusting region 16 is formed using a wet etching method, the buffer layer 14 is not contaminated because the etching solution and resist removal agent do not directly contact the buffer layer 14 if the dielectric layer 15 is provided.

In this manner, by providing the dielectric layer 15, contamination of the buffer layer 14 is prevented, and consequently, DC drift caused by ions derived from such contaminants can be suppressed, allowing the manufacture of an optical waveguide type optical modulator 10 with excellent long-term reliability. Furthermore, any reduction in the dielectric properties of the buffer layer 14 caused by contamination can also be suppressed, and there is no danger that a portion of, or most of the electric field from the electrodes 13 dissipate through the buffer layer 14, resulting in an electric field being efficiently applied to the optical waveguides 12. Accordingly, the effects of providing the signal field adjustment region 16 can be fully realized.

Furthermore, according to such a manufacturing method, because an optical waveguide type optical modulator 10 with excellent reliability can be manufactured by simply providing a dielectric layer 15 on the buffer layer 14, it is not necessary to strictly control the process conditions of the lift-off process or the etching process.

After forming the signal field adjustment region 16 in this manner, the traveling-wave type signal electrode 13a is formed on the signal field adjustment region 16 by an Au electroplating method or the like, and the ground electrodes 13b are formed on the exposed dielectric layer 15 exposing to both sides of the signal field adjustment region 16, thereby completing the manufacture of the optical waveguide type optical modulator 10.

Such an optical waveguide type optical modulator 10 can be used as an optical intensity modulator or a phase modulator, and can also be used as an integrated modulator, by combining plural devices.

EXAMPLES

As follows is a detailed description of examples of the embodiments of the present invention.

Example 1

The optical waveguide type optical modulator 10 shown in FIG. 1 was manufactured in the following manner.

Optical waveguides 12 were formed on the surface of the ferroelectric substrate 11, which is made of lithium niobate, by performing diffusion processing of an optical waveguide pattern made of titanium having a thickness of 90 nm, for 15 hours under an oxygen atmosphere and at a temperature of 1000° C. A silicon oxide ($SiO_2$) film with a thickness of 1000 nm, which forms the buffer layer 14, was then deposited on the substrate using a vacuum deposition method. After performing heat treatment at 500° C. in a stream of oxygen, a dielectric layer 15, which is made of silicon nitride and has a thickness of 100 nm, was formed on the entire surface of the buffer layer 14 by a sputtering method.

Then, after a photoresist was spin-coated on the entire surface of the dielectric layer 15 and subsequently hardened, a signal field adjustment region 16 was exposed onto the photoresist using a photomask. After development and removal of the section of the photoresist where the signal field adjustment region 16 is to be formed, a silicon film was formed by a sputtering method. The resist was removed using a resist removal agent, and the entire film except for the predetermined position where the signal field adjustment region 16 is to be formed was also removed together with the resist, thereby forming a signal field adjustment region 16 made of silicon having a thickness of 100 nm in the center of the substrate.

After the signal field adjustment region 16 was formed by means of an electrolytic plating process and a traveling-wave type signal electrode 13a made of Au was formed on this signal field adjustment region 16, and ground electrodes 13b, also made of Au, were formed on the dielectric layer 15, exposing both sides of the signal field adjustment region 16.

Example 2

The optical waveguide type optical modulator 10 shown in FIG. 1 was manufactured in the same manner as in the example 1, with the exception that the dielectric layer 15 was formed of silicon oxynitride.

Comparative Example 1

The optical waveguide type optical modulator was manufactured in the same manner as in the example 1, with the exception that a dielectric layer was not formed.

Test Results 1

The stability of the optical waveguide type optical modulators obtained in the examples 1 and 2 and the comparative example 1 were evaluated using the following method.

Namely, each optical waveguide type optical modulator was placed in a thermostatic oven set to be 85° C., and an initial DC bias of 3.5 V was applied. The optical waveguide type optical modulator was then operated for 24 hours, and feedback control of the applied DC bias was performed, while checking the modulation state of the optical output signal using an oscilloscope, so that the modulation state of the signal remained in the same state as when the initial DC bias was applied, and changes in the applied DC bias were recorded over the 24 hours. The results are shown in FIG. 4.

Figure 4:
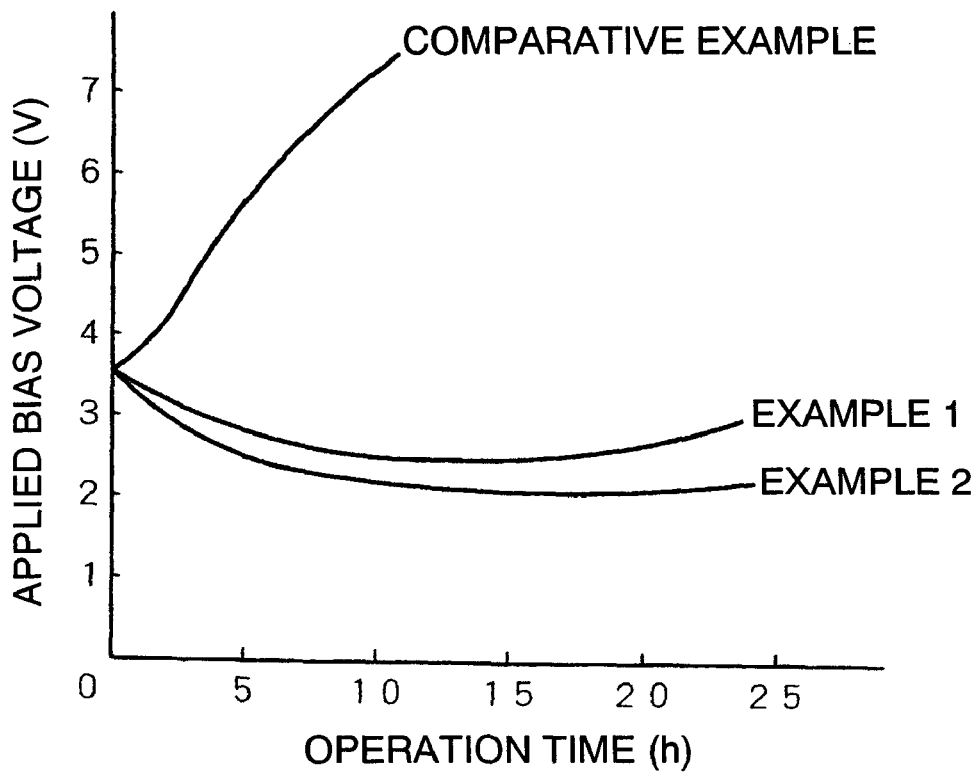
FIG. 4 is a graph showing the relationship between the applied bias voltage and the operation time of examples 1 and 2 and a comparative example 1.

As shown in FIG. 4, in the optical waveguide type optical modulators of the present embodiment in which the dielectric layer was formed, the applied DC bias shows small rise compared with the comparative example, showing that DC drift was suppressed. Accordingly, long-term operational stability can be improved by using an optical waveguide type optical modulator of the present embodiment.

Next, an optical waveguide type optical modulator according to a second embodiment of the present invention is described.

Figure 5:
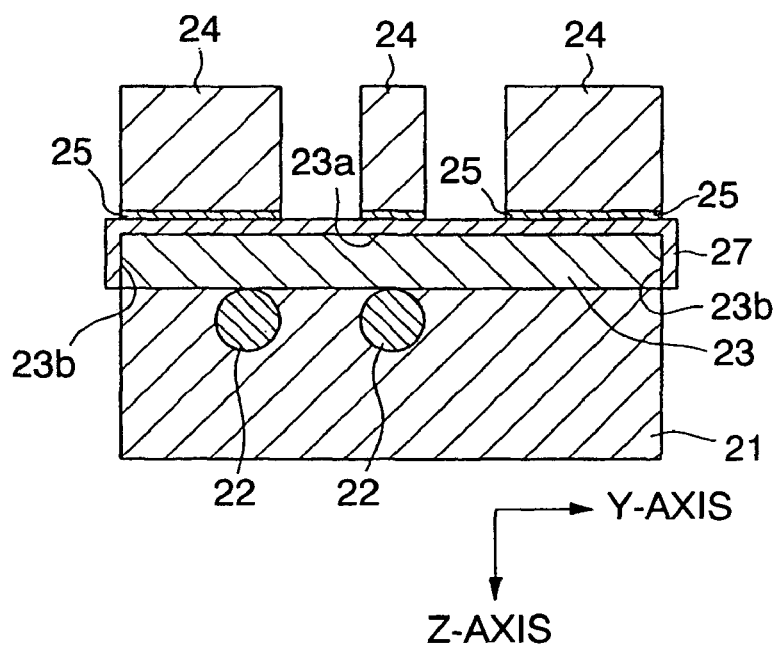
FIG. 5 is a cross-sectional view showing an example of an optical waveguide type optical modulator of a second embodiment.

FIG. 5 is a cross-sectional view showing an example of an optical waveguide type optical modulator of the second embodiment. This optical waveguide type optical modulator also uses a ferroelectric substrate made of lithium niobate (LiNbO$_3$), which is the most common and practical material for optical waveguide type optical modulators employing a ferroelectric substrate.

In FIG. 5, reference numeral 21 indicates a Z-cut ferroelectric substrate made of lithium niobate. The axis inducing the electro-optic effect of this ferroelectric substrate 21 is in the direction of the Z axis, which is the main optical axis (the crystallographic c axis), and is in a direction orthogonal to the main surface of the ferroelectric substrate 21 as shown in FIG. 5.

Optical waveguides 22 fabricated by thermal diffusion of Ti are formed on the main surface of the ferroelectric substrate 21. Here, the "main surface" refers to the surface of the ferroelectric substrate on which the optical waveguides are formed. The lightwave guiding direction of this optical waveguide type optical modulator is the lengthwise direction of the optical waveguides 22. A buffer layer 23 is formed on the optical waveguides 22, and a protective film 27 is formed on the entire upper surface 23a of the buffer layer 23 as well as on the side surfaces 23b of the buffer layer 23 in the direction parallel to the optical waveguide. In addition, electrodes 24 made of Au are formed on the protective film 27 so as to be parallel to the optical waveguides 22. In FIG. 5, the electrode 24 positioned in the center is a signal electrode, and the electrodes 24 positioned in both sides thereof are ground electrodes. A transition metal layer 25 made from a transition metal such as Ti, Cr, or Ni or the like is provided between the electrodes 24 and the protective film 27.

In this optical waveguide type optical modulator, the buffer layer 23 is made of SiO$_2$ with a low refractive index.

Furthermore, the protective film 27 is an electrically insulating amorphous film having a thickness from 50 to 200 nm, which is also made of SiO$_2$, the same material as the buffer layer 23.

In order to manufacture such an optical waveguide type optical modulator, at first, the optical waveguides 22 are formed on the surface of the ferroelectric substrate 21 by thermal diffusion, and the buffer layer 23 is subsequently formed by a vacuum deposition method on the side of the ferroelectric substrate 21 on which the optical waveguides 22 are formed. At this time, in order to adequately oxidize the buffer layer 23, heat treatment (annealing) is performed under an oxidizing atmosphere at 500 to 700° C. for approximately 5 to 10 hours. Next, the ferroelectric substrate 21 having the buffer layer 23 is placed in a film deposition apparatus for forming the protective film 27, and the protective film 27 is formed on the entire surface 23a of the buffer layer 23 using a sputtering method. At this time, before forming the protective film 27, heat treatment may be performed with an object of removing the moisture (H$_2$O, —OH) in the buffer layer 23, and increasing the hardness of the protective film 27. Subsequently, a transition metal film and an Au film are formed sequentially by a vacuum deposition or sputtering method. In addition, a thick Au layer is accumulated on this Au film by an electroplating process, only within an electrode forming region, where the electrodes 24 are to be formed, thereby forming the electrodes 24. Subsequently, the Au film and the transition metal film remaining between the electrodes 24 is removed by chemical etching, thereby forming a transition metal layer 25 only beneath the electrodes 24.

Next, the ferroelectric substrate 21 is cut into a chip shape, and a protective film 27 is formed on the side surfaces 23b of the buffer layer 23. To form the protective film 27 on the side surfaces 23b of the buffer layer 23, the entire side surface of the chip other than the side surfaces 23b of the buffer layer 23 is covered using a resist or the like, and a protective film 27 is formed using the same sputtering method or the like used for the protective film 27 formed on the buffer layer 23.

In the manufacturing method described above, the protective film 27 may be formed either duration of heat treatment or the period after the heat treatment has been completed. In this case, the condition of heat treatment may be set, foe example, to be a temperature of 100 to 300° C., a processing time of 1 to 20 hours, and a degree of vacuum of $1\times10^{-5}$ to $1\times10^{-1}$ Pa.

In such an optical waveguide type optical modulator according to the second embodiment, since the protective film 27 is provided on the entire upper surface 23a and the side surfaces 23b of the buffer layer 23, the surface 23a and the side surfaces 23b of the buffer layer 23 are not exposed, and contamination of the surface 23a of the buffer layer 23 or the inside of the buffer layer 23 is hard to occur.

In the optical waveguide type optical modulator described above, the protective film is preferably provided on the entire upper surface of the buffer layer, including the area where the electrodes are formed. In such an optical waveguide type optical modulator, the entire surface of the buffer layer is covered by the protective film, and consequently contamination of the buffer layer during the manufacturing process succeeding after the protective layer formation can be prevented, and the buffer layer is more effectively protected from the penetration of contaminants.

In addition, because the protective film is formed on the entire surface of the buffer layer, the protective layer is easier to form than in a case that the protective film is formed only on a part of the surface of the buffer layer.

Furthermore, the protective film provided on the surface of the buffer layer and the protective film provided on the side surfaces of the buffer layer in the direction parallel to the optical waveguide are preferably made of the same material.

Using such a configuration of an optical waveguide type optical modulator, it is possible to improve the chemical bonding strength between the protective layer provided on the buffer layer and the protective layer provided on the side surfaces of the buffer layer in the direction parallel to the optical waveguide. Furthermore, because the thermal expansion characteristics of the protective layer provided on the buffer layer and the protective layer provided on the side surfaces of the buffer layer are the same, the adhesion at the interface between these layers is also thermally stable. These factors allow the protective layer to have enhanced resistant effect for the buffer layer contamination and to have greater stability.

In addition, because the protective film 27 is electrically insulating, leakage of the electric current applied to the electrodes 24 can be prevented, and stable operation of the optical waveguide type optical modulator can be ensured. Accordingly, the occurrence of DC drift can be prevented. Furthermore, since the buffer layer 23 is not easily contaminated, a reduction in the bonding strength between the ferroelectric substrate and the buffer layer caused by contamination of the buffer layer does not easily occur. In this case "electrically insulating" means a resistance for the direct current being greater than 20 MΩ, and preferably greater than 50 MΩ.

Furthermore, because the buffer layer 23 is not easily contaminated, even if the density of the buffer layer 23 is low, problems caused by contamination of the buffer layer is hard to occur. Consequently, the buffer layer 23 can be formed using a vacuum deposition method, which forms a buffer layer 23 with low density. Furthermore, it is possible to select the density of the buffer layer 23 and the method of forming the buffer layer 23 according to requirement.

In addition, because the thickness of the protective film 27 is between 50 and 200 nm, the occurrence of DC drift can be effectively prevented.

It is not favorable for the thickness of the protective layer to be less than 50 nm, since the effect of preventing contamination of the surface and the inside of the buffer layer is insufficient, and the electric current applied to the electrodes becomes easy to leak, meaning the occurrence of DC drift cannot be sufficiently prevented. On the other hand, it is not favorable for the thickness of the protective layer to exceed 200 nm, since the protective film having different properties from the buffer layer occupies a large proportion of the thickness of the buffer layer (approximately 1 μm) being adjusted and optimized its density or the like to suppress DC drift, the effects of the buffer layer are weakened remarkably resulting in a deterioration in the effect for preventing the occurrence of DC drift.

Furthermore, because the protective film 27 is provided between the buffer layer 23 and the transition metal layer 25 provided beneath the electrodes 24, and the entire upper surface 23a of the buffer layer 23 is covered by the protective film 27, contamination of the buffer layer 23 during the manufacturing process following the formation of the protective film 27 can be prevented.

In other words, contamination of the buffer layer 23 by such processes as the chemical etching of the Au film and the transition metal film performed during the process of forming the transition metal layer 25 and the electrodes 24 on the protective film 27 can be prevented.

Furthermore, because the protective film 27 is formed between the buffer layer 23 and the transition metal layer 25, the buffer layer 23 and the transition metal layer 25 do not contact each other, embrittlement of the transition metal layer 25 derived from its oxidation caused by absorbed moisture by the buffer layer 23 can be prevented. As a result, weakening of the bonding strength between the buffer layer 23 and the transition metal layer 25 causing embrittlement of the latter can be prevented, ensuring the reliability of the optical waveguide type optical modulator.

In addition, because the protective film 27 is formed on the entire surface 23a of the buffer layer 23, the protective film 27 is formed easier compared with the case that the protective film 27 is formed on a portion of the surface 23a of the buffer layer 23.

Moreover, since the protective film 27 is made of $SiO_2$, the physical characteristics of the protective film 27 and the buffer layer 23, such as the coefficient of thermal expansion and the like, are the same, resulting in the bonding strength between the protective film 27 and the buffer layer 23 to be excellent.

In addition, because the ferroelectric substrate 21 is made of lithium niobate, which is relatively easy to grow into large crystals, it is possible to realize large scale integrated devices.

Furthermore, since single crystal of lithium niobate has high Curie temperature, at approximately up to 1000° C., there is a high degree of freedom with regard to temperature in the manufacturing process of the optical waveguide type optical modulator.

Moreover, because the transition metal layer 25 is provided between the electrodes 24 and the protective film 27, the bonding strength between the electrodes 24 and the protective film 27 can be improved.

In other words, the transition metal layer 25 has a function of forming an alloy (solid solution) or an intermetallic compound at the interface with the electrodes 24, fabricated by chemically inactive Au at the interface with the protective film 27, thereby functioning as an adhesive which joins the electrodes 24 and the protective film 27. Accordingly, the bonding strength between the electrodes 24 and the protective film 27 can be improved.

Furthermore, because the protective film 27 is formed using a sputtering method in the manufacturing method described above, the protective film 27 can be formed easily.

In addition, because the entire protective film 27 is made of the same material, the protective film 27 can be formed easily with few manufacturing steps.

Because the protective film is formed after the ferroelectric substrate 21 having the buffer layer 23 undergoes heat treatment in the film deposition apparatus preceding the formation of the protective film 27, even if the buffer layer adsorbs moisture during the interval between the buffer layer 23 formation and the protective film 27 formation, this moisture can be removed by the heat treatment. Accordingly, an optical waveguide type optical modulator with excellent stability of operation can be obtained.

In the optical waveguide type optical modulator of the present invention, it is preferable that the protective film 27 is formed on the entire upper surface 23a and the side surfaces 23b of the buffer layer 23 as shown in FIG. 5, although the protective film is needed to provide at least on the sections of the buffer layer 23 where the electrodes 24 are not formed.

Figure 6:
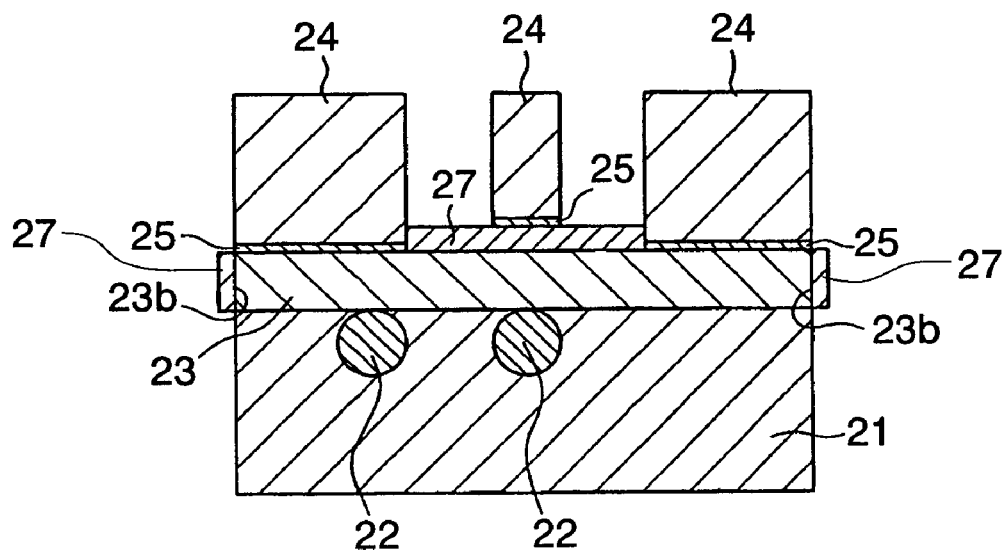
FIG. 6 is a cross-sectional view showing another example of an optical waveguide type optical modulator of the second embodiment.
Figure 7:
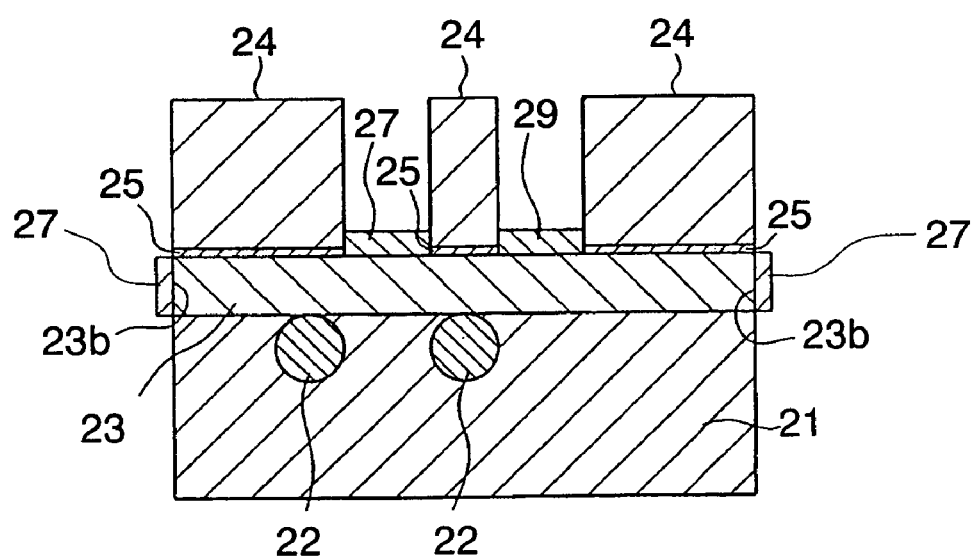
FIG. 7 is a cross-sectional view showing yet another example of an optical waveguide type optical modulator of the second embodiment.

For example, as shown in FIG. 6, the protective layer 27 may be provided on the surfaces of the buffer layer 23 where the electrodes 24 are not formed, and between the buffer layer 23 and a part of the electrodes 24, and on the side surfaces 23b of the buffer layer 23. Alternatively, as shown in FIG. 7, a protective film 29 may be provided on the surfaces of the buffer layer 23 where the electrodes 24 are not formed, and on the side surfaces 23b of the buffer layer 23.

Furthermore, in the optical waveguide type optical modulator of the present invention, as shown in the examples described above, it is preferable that a substrate made of lithium niobate is used as the ferroelectric substrate, although the ferroelectric substrate is not limited to lithium niobate, and, for example, a substrate made of lithium tantalate could also be used.

In the optical waveguide type optical modulator of the present invention, the transition metal layer 25 may be provided between the electrodes 24 and the protective film 27 as described in the examples above, although the transition metal layer 25 is not be necessarily to provided at all, and there are no particular restrictions relating to the transition metal layer 25.

In addition, in the optical waveguide type optical modulator of the present invention, the optical waveguides 22 can be formed by diffusing Ti as described in the examples above, but the dopant to form the optical waveguides are not restricted to this material.

Furthermore, in order to propagate high frequency electric signals to the electrodes 24, it is preferable that the buffer layer 23 in the optical waveguide type optical modulator of the present invention is made of $SiO_2$ which has a low dielectric constant, and that the electrodes 24 are made of Au which has sufficiently low electrical resistance, as described in the examples above, but the materials used to form the buffer layer 23 and the electrodes 24 are not restricted to the materials described above.

Moreover, in the optical waveguide type optical modulator of the present invention, the protective film may be made of $SiO_2$ as described in the examples above, but any electrically insulating material can be used, and there are no particular restrictions.

For example, the protective film may be made of silicon (Si) or silicon oxynitride or the like. If silicon is used as the protective film, it can be formed by methods such as RF sputtering, using a pure silicon target and Ar gas as the sputtering gas. At this time, if the temperature of the ferroelectric substrate is controlled to be approximately 250° C., then an excellent Si film with few defect is obtained, which has extremely high electrical resistance, and is substantially an insulator. Because a protective film made of silicon (Si) does not contain oxygen, the transition metal layer formed on the protective layer does not deteriorate by its oxidation. Accordingly, there is no danger of oxidation of the transition metal layer causing embrittlement of the transition metal layer and weakening of the bonding strength between the buffer layer and the transition metal layer, which improves the reliability of the optical waveguide type optical modulator.

Furthermore, in the optical waveguide type optical modulator of the present invention, the entire protective film may be made of the same material, as described in the examples above, but the protective film provided on the buffer layer and the protective film provided on the side surfaces of the buffer layer may be made of different materials, for example, and there are no particular restrictions to the materials.

In the method of manufacturing the optical waveguide type optical modulator of the present invention, the protective film 27 is preferably formed after performing heat treatment of the ferroelectric substrate 21 having the buffer layer 23 in a deposition apparatus, as described in the examples above, but this heat treatment need not necessarily to be performed.

Furthermore, in the method of manufacturing the optical waveguide type optical modulator of the present invention, the buffer layer 23 may be formed by a vacuum deposition method, as described in the examples above, but the method to form the buffer layer is not limited to vacuum deposition, and the buffer layer 23 may also be formed using a high-energy film deposition method such as a sputtering method, for example, to provided a buffer layer with high density.

In the method of manufacturing the optical waveguide type optical modulator of the present invention, there is some cases that the surfaces on the buffer layer 23 where the electrodes 24 are not formed are not completely covered by the protective film, due to the deviation occurring in the manufacturing process. However, even if the protective film is not formed on a portion of the surface of the buffer layer 23 where the electrodes 24 are not formed, the objects of the present invention can still be achieved when the protective film is formed on the most part of the buffer layer 23 on which the electrodes 24 are not formed.

The optical waveguide type optical modulator according to the second embodiment of the present invention is described in detail below using examples (see FIG. 5).

Example 3

Optical waveguides 22 were formed on the surface of a ferroelectric substrate 21 made of Z-cut lithium niobate by performing a diffusion processing of an optical waveguide pattern made of Ti having a thickness of 90 nm, for 20 hours under an oxygen atmosphere and at a temperature of 1000° C. A $SiO_2$ film with a thickness of 1 $\mu$m, which forms the buffer layer 23, was deposited on the substrate using a vacuum deposition method. After performing heat treatment at 600° C. for 5 hours in a stream of oxygen, an upper protective film 27 made of $SiO_2$ having a thickness of 50 nm was formed on the entire surface of the buffer layer 23 by employing RF sputtering.

A transition metal layer made of Ti having a thickness of 50 nm, and an Au film having a thickness of 50 nm were formed sequentially on the protective film 27, using a vacuum deposition method within the same film deposition apparatus. A resist pattern was formed on the Au film using photolithographic techniques, and a thick Au layer was accumulated on this Au film by an electroplating process, only within the portions where the resist pattern was not formed, namely the portions where the Au film was exposed, thereby forming the electrodes 24. The resist mask was removed using an organic solvent, and the Au film and the transition metal film remaining between the electrodes 24 were removed by etching using solution of iodine and potassium iodide and a mixed solution of ammonia and hydrogen peroxide, respectively. Then, the ferroelectric substrate 21 was cut into a chip shape. After the cutting, the side surface protective film 27 was formed from $SiO_2$ having a thickness of 50 nm by employing RF sputtering on the side surfaces 23b of the buffer layer 23. The optical waveguide type optical modulator shown in FIG. 5 was obtained in this manner.

Example 4

Using the same ferroelectric substrate 21 as in the example 3, the optical waveguide 22 and the buffer layer 23 were formed in the same manner as in the example 3, and a protective film 27 with a thickness of 200 nm was formed on the upper surface of the buffer layer 23 in the same manner as in the example 3.

The transition metal layer 25 and the electrodes 24 were formed on the protective film 27 in the same manner as in example 3, and after cutting the substrate into a chip shape as in the example 3, the side surface protective film 27 with a thickness of 200 nm was formed on the side surfaces 23b of the buffer layer 23, thereby obtaining the optical waveguide type optical modulator shown in FIG. 5.

Example 5

Using the same ferroelectric substrate 21 as in the example 3, the optical waveguide 22 and the buffer layer 23 were formed in the same manner as in the example 3, and the resulting substrate was placed in the film deposition apparatus in which the protective film 27 is formed, and heat treatment was performed at 250° C. for one hour under a degree of vacuum of $2 \times 10^{-5}$ Pa. Subsequently, while maintaining the temperature at 250° C., Ar gas was introduced in the chamber as the sputtering gas until its interior pressure to be 0.2 Pa, and RF sputtering was performed using a pure silicon target with no dopant, thereby forming the upper protective film 27 with a thickness of 100 nm on the entire surface of the buffer layer 23.

The transition metal layer 25 and the electrodes 24 were formed on this protective film 27 in the same manner as in the example 3. The ferroelectric substrate 21 was cut into a chip shape, and the side surface protective film 27 with a thickness of 100 nm was formed on the side surfaces 23b of the buffer layer 23 using the same method employed to form the protective film 27 on the surface of the buffer layer 23, thereby obtaining the optical waveguide type optical modulator shown in FIG. 5. In this optical waveguide type optical modulator, the interelectrode resistance between the signal electrode and the ground electrode was greater than 30 MΩ.

Conventional Example

Figure 10:
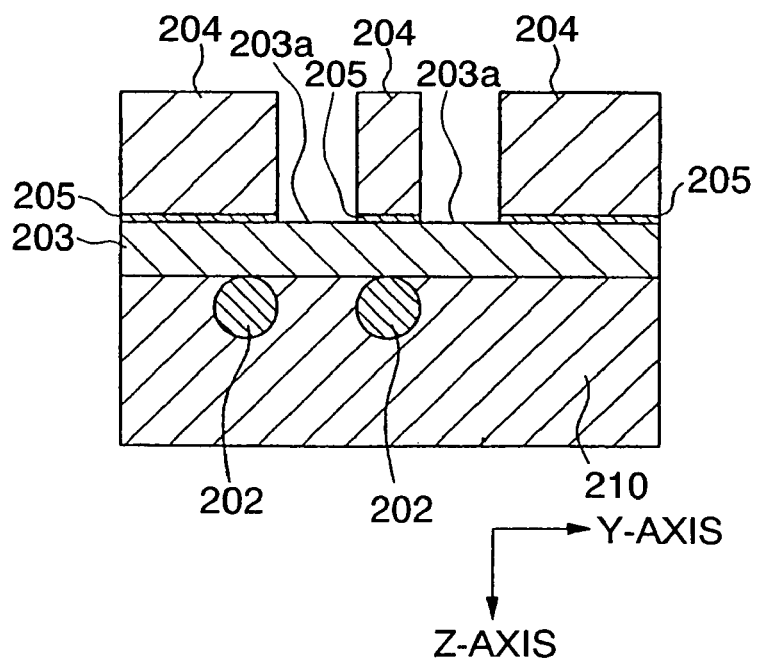
FIG. 10 is a cross-sectional view showing a second configuration example of a conventional optical waveguide type optical modulator.

The optical waveguide 22 and the buffer layer 23 were formed on the same ferroelectric substrate 21 as in the example 3, and the transition metal layer 25 and the electrodes 24 were formed on this buffer layer 23 in the same manner as in Example 2, thereby obtaining the optical waveguide type optical modulator shown in FIG. 10.

Comparative Example 2

The optical waveguides 22, and the buffer layer 23 which has a thickness of 100 nm, were formed in the same manner as in the example 3, using the same ferroelectric substrate 21 as in the example 3, and the upper protective film 27 with a thickness of 900 nm was formed on the entire surface of the buffer layer 23 in the same manner as in the example 3.

Subsequently, the transition metal layer 25 and the electrodes 24 were formed on this upper protective film 27 in the same manner as in the example 3, thereby obtaining the optical waveguide type optical modulator shown in FIG. 5.

Test Results 2

The following tests were performed to examine the stability of the optical waveguide type optical modulators obtained in the examples 3 to 5, the conventional example, and the comparative example 2.

Namely, each of the optical waveguide type optical modulators obtained in the examples 3 to 5, the conventional example, and the comparative example 2 were placed in a thermostatic oven set to be 85° C., and an initial DC bias of 3.5 V was applied. The optical waveguide type optical modulator was operated for 60 hours, and feedback control of the applied DC bias was performed, while checking the modulation state of the optical output signal using an oscilloscope, so that the modulation state of the signal remained in the same state as the initial DC bias was applied, and changes in the applied DC bias were recorded.

Figure 8:
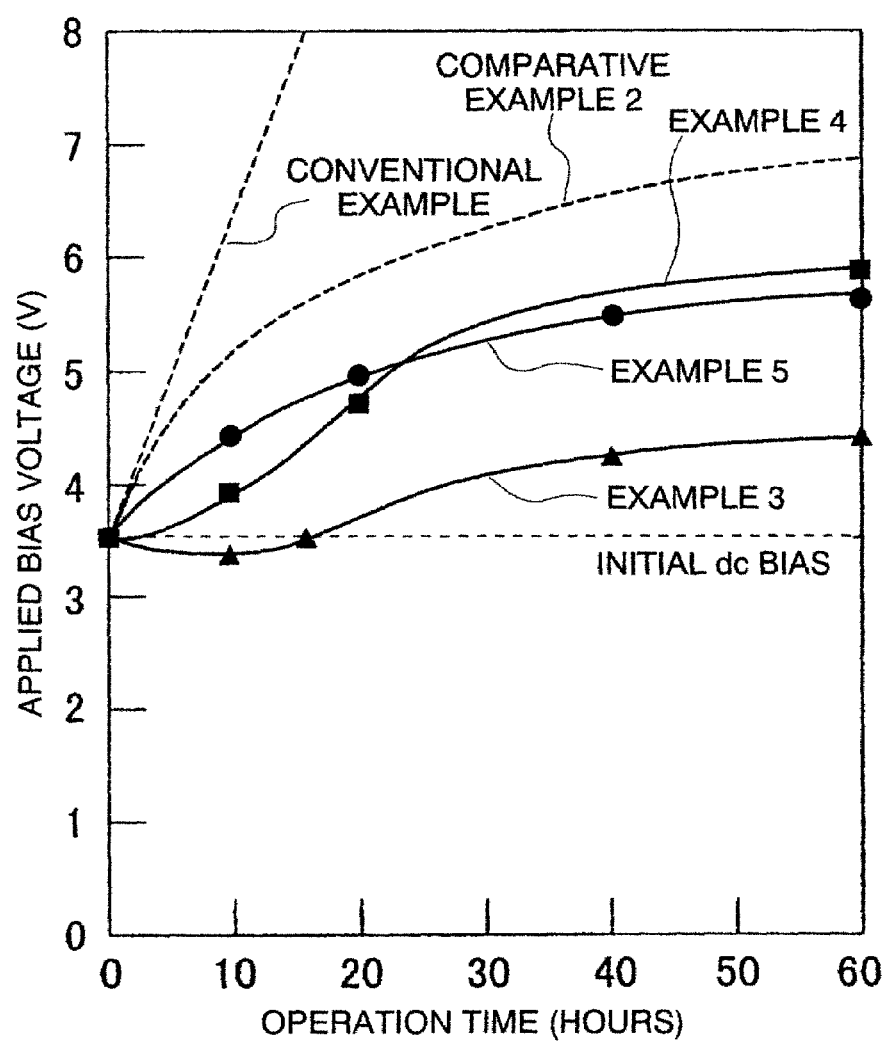
FIG. 8 is a graph showing the relationship between the applied bias voltage and the operation time of examples 3 through 5, a comparative example 2 and a conventional example.
Figure 9:
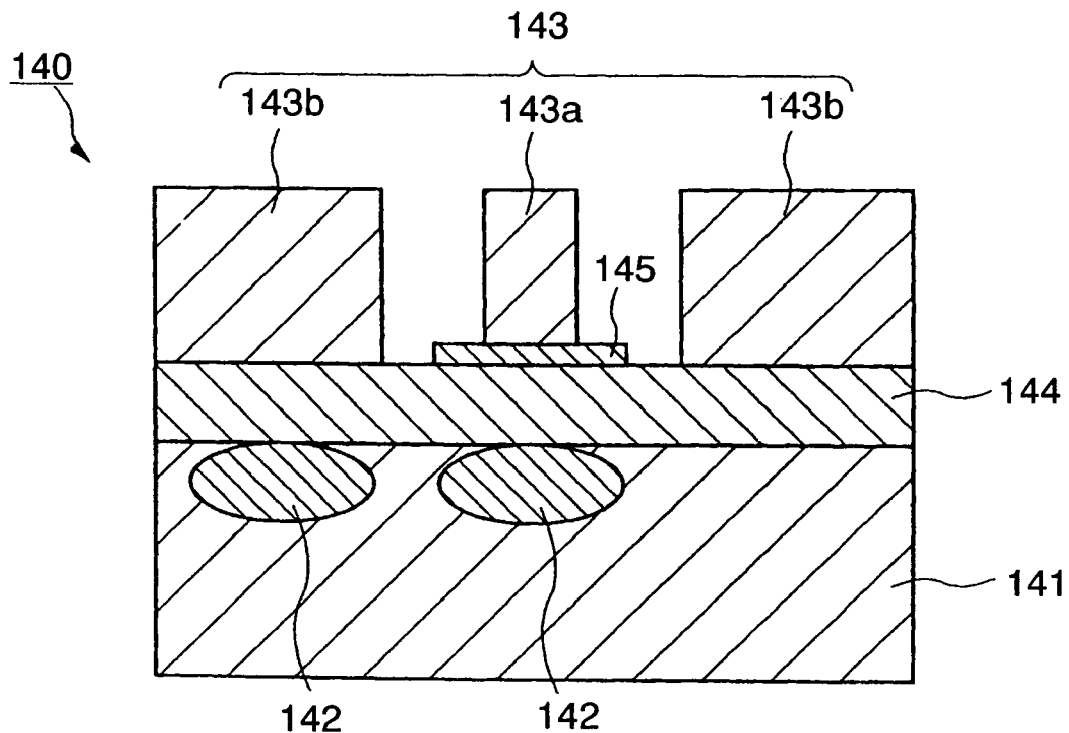
FIG. 9 is a cross-sectional view showing a first configuration example of a conventional optical waveguide type optical modulator.

The results are shown in FIG. 8.

As shown in FIG. 8, in the conventional example of the second embodiment, having no protective film 27, the applied DC bias rises remarkably with time. On the other hand, in the examples 3 to 5, the rise in DC bias is small compared to the conventional example. Furthermore, in the comparative example 2 in which the thickness of the protective film 27 exceeds the desirable range, the rise in DC bias is large compared to the examples 3 to 5.

Because smaller variation in applied DC bias means smaller DC drift and excellent stability in the optical signal output from the optical waveguide type optical modulator, it is apparent that stability in the operation of the optical waveguide type optical modulator can be improved by providing the protective film 27.

Furthermore, it is also apparent that it is preferable for the thickness of the protective film 27 to be the same or less than 200 nm.

INDUSTRIAL APPLICABILITY

The present invention relates to an optical waveguide type optical modulator using a ferroelectric crystal as a substrate, and a manufacturing method thereof. The optical waveguide type optical modulator of the present invention is ideally suited to use in optical fiber communication systems and the like.

What is claimed is:

1. An optical waveguide type optical modulator comprising a substrate having an electro-optic effect, optical waveguides formed on the surface of this substrate, a traveling-wave type signal electrode and ground electrodes which are provided on the substrate and control a guided lightwave, and a buffer layer provided between the electrodes and the optical waveguides, and furthermore, a dielectric layer is provided on the entire surface of the buffer layer on the side of the electrodes, wherein
   a signal field adjustment region which has a wider width than that the traveling-wave type signal electrode and is made of a material with a higher refractive index than that of the dielectric layer is formed between the dielectric layer and the traveling-wave type signal electrode.

2. An optical waveguide type optical modulator according to claim 1, wherein the signal field adjustment region is made of silicon.

3. An optical waveguide type optical modulator according to claim 1, wherein the substrate is made of lithium niobate, the buffer layer is made of silicon oxide, and the dielectric layer is made of silicon nitride or silicon oxynitride.

4. An optical waveguide type optical modulator according to claim 1, wherein, the thickness of the dielectric layer is the same or less than that of the signal field adjustment region.

5. An optical waveguide type optical modulator comprising a ferroelectric substrate made of a single crystal having an electro-optical effect and with optical waveguides formed on a main surface thereof, and a buffer layer and electrodes provided on the main surface side of said ferroelectric substrate, wherein the axis of said ferroelectric substrate inducing an electro-optical effect is orthogonal to said main surface of said ferroelectric substrate, and an electrically insulating protective film with a thickness of 50 to 200 nm is provided on the upper surface of said buffer layer at least in those regions where said electrodes are not formed, and on the side surfaces of said buffer layer parallel to the guided lightwave direction.

6. An optical waveguide type optical modulator according to claim 5, wherein said protective film is provided on the whole area of the upper surface of said buffer layer including the regions where said electrodes.

7. An optical waveguide type optical modulator according to claim 5, wherein the protective film provided on the upper surface of said buffer layer and the protective film provided on the side surfaces on said buffer layer parallel to the lightwave-guiding direction are made of the same materials.

8. An optical waveguide type optical modulator according to claim 5, wherein said protective film is an amorphous film.

* * * * *